US012424431B2

(12) United States Patent
Kobayashi et al.

(10) Patent No.: US 12,424,431 B2
(45) Date of Patent: Sep. 23, 2025

(54) EXCIMER LAMP AND UV IRRADIATION UNIT INCLUDING THE SAME

(71) Applicant: ORC MANUFACTURING CO., LTD., Tokyo (JP)

(72) Inventors: Go Kobayashi, Nagano (JP); Shigeru Kitazawa, Nagano (JP); Izumi Serizawa, Nagano (JP)

(73) Assignee: ORC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/804,357

(22) Filed: Aug. 14, 2024

(65) Prior Publication Data

US 2025/0140546 A1 May 1, 2025

(30) Foreign Application Priority Data

Oct. 27, 2023 (JP) ................................ 2023-184501

(51) Int. Cl.
*H01J 61/06* (2006.01)
*H01J 61/12* (2006.01)

(52) U.S. Cl.
CPC .............. *H01J 61/06* (2013.01); *H01J 61/12* (2013.01)

(58) Field of Classification Search
CPC ................................ H01J 61/06; H01J 61/12
USPC ........................................................ 313/607
See application file for complete search history.

(56) References Cited

FOREIGN PATENT DOCUMENTS

| | | | |
|---|---|---|---|
| EP | 2608245 A4 * | 1/2014 | ............. H01J 61/00 |
| JP | 2016-146295 | 8/2016 | |
| JP | 6537418 | 7/2019 | |
| JP | 6541362 | 7/2019 | |
| JP | 6573513 | 9/2019 | |
| JP | 2020-107424 | 7/2020 | |
| JP | 6800678 | 12/2020 | |
| JP | 7185521 | 12/2022 | |

* cited by examiner

*Primary Examiner* — James R Greece
*Assistant Examiner* — Hana S Featherly
(74) *Attorney, Agent, or Firm* — Greenblum & Bernstein, P.L.C.

(57) ABSTRACT

An excimer lamp includes an exterior tube, an interior tube coaxially arranged in the exterior tube, and an inner electrode embedded between the exterior tube and a cladding tube configured to cover at least part of the exterior tube. An outer electrode is provided at the side of the outer surface of the exterior tube. The inner electrode is a foil electrode and the opposite sides of the inner electrode are flattened along the width direction. Both edges of the inner electrode are pointed.

9 Claims, 5 Drawing Sheets

EXCIMER LAMP AND UV IRRADIATION UNIT INCLUDING THE SAME

BACKGROUND OF THE INVENTION

1. Field of the Invention

The present invention relates to an excimer lamp that radiates ultraviolet light by emission of excimer molecules, and a UV (Ultraviolet) irradiation unit with an excimer lamp.

2. Description of the Related Art

A hollow cylinder-type excimer lamp is equipped with dual cylindrical tubes, of which an interior tube and an exterior tube extend along the axis of the lamp and are coaxially arranged with the interior tube welded to the exterior tube. The cylindrical coaxial tubes form a light-emitting portion of the lamp, i.e., a discharge space and a flow channel inside of the interior tube. Ultraviolet light emits from the discharge space to an object such as a raw material gas that flows in the flow channel.

One of electrodes (inner electrode) is embedded in the exterior tube while the other electrode (outer electrode) is arranged on the outer surface of the exterior tube so that the inner and outer electrodes are opposite one another. In the case of an excimer lamp with a discharge tube and a cladding tube that covers the discharge tube, an inner electrode is embedded between the discharge tube and the cladding tube and an outer electrode such as an aluminum membrane covers the outer surface of the discharge tube. A discharge for emitting ultraviolet light occurs by applying high voltage (e.g., several kilovolts) between the electrodes.

In such an excimer lamp (especially, a downsized or miniaturized excimer lamp), the form or construction of the inner and outer tubes, i.e., the diameter and thickness of the tubes, are restricted since a discharge tube with a large discharge space is required to enhance the intensity of illumination. These restrictions make the application of high voltage difficult since the width of electrodes is restricted and there is a possibility that the inner electrode could peel off.

SUMMARY OF THE INVENTION

The present invention is an improvement of the hollow cylinder-type excimer lamp.

An excimer lamp according to one aspect of the present invention includes an exterior tube, an interior tube coaxially arranged in the exterior tube, and an inner electrode embedded between the exterior tube and a cladding tube configured to cover at least part of the exterior tube. An outer electrode is provided at one side of the outer surface of the exterior tube. The inner electrode is a foil electrode and the opposite sides of the inner electrode are flattened along the width direction. Both edges of the inner electrode are pointed.

An UV irradiation unit according to another aspect of the present invention includes the excimer lamp and an electric power supply device configured to supply electric power to the excimer lamp.

BRIEF DESCRIPTION OF THE DRAWINGS

The present invention will be better understood from the description of the preferred embodiment of the invention set forth below together with the accompanying drawings, in which.

DESCRIPTION OF THE PREFERRED EMBODIMENTS

Hereinafter, the preferred embodiments of the present invention are described with references to the attached drawings.

Figure 1:
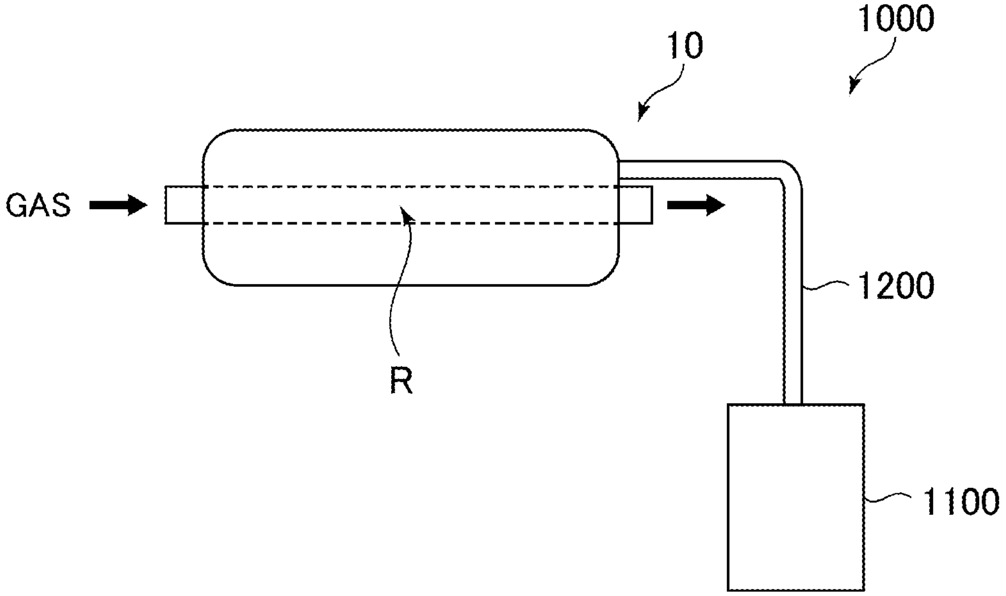
FIG. 1 is a schematic view showing a UV irradiation unit according to a first embodiment.

FIG. 1 is a schematic view showing a UV irradiation unit 1000 according to the first embodiment.

The UV irradiation unit 1000 is equipped with an excimer lamp 10 and an electric power supply 1100. The excimer lamp 10 is connected to the electric power supply 1100 via a power supply line 1200. The UV irradiation unit 1000 is a module-type unit, which may be incorporated into an ozonizing unit, a deodorizing unit, and so on. The excimer lamp 10, which is a hollow cylinder-type excimer lamp with a flow channel R, irradiates ultraviolet light to an object to be irradiated. Herein, fluid such as a pure gas including oxygen flows in the flow channel R.

Figure 2:
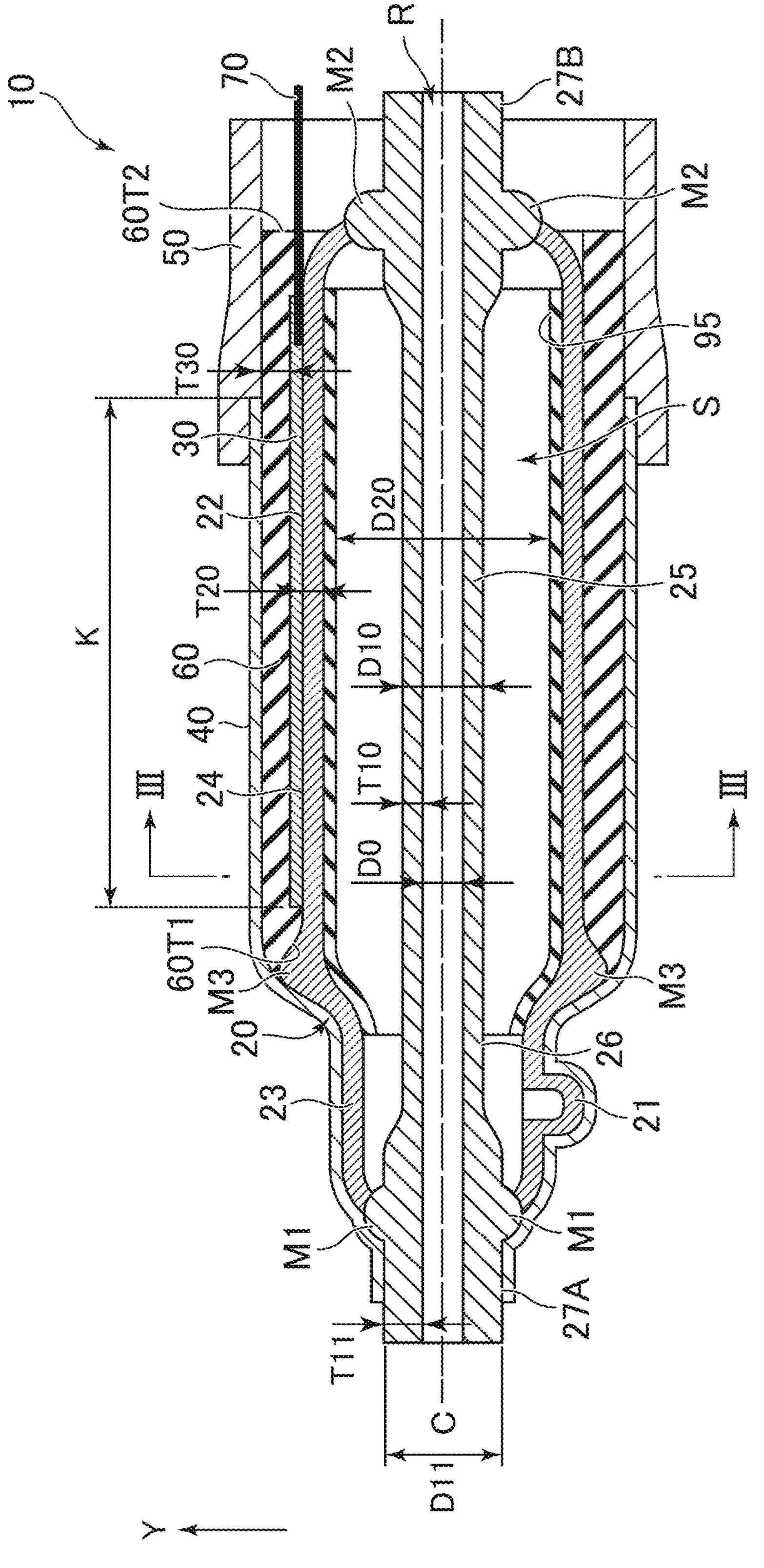
FIG. 2 is a cross-sectional view of an excimer lamp in the UV irradiation unit.
Figure 3:
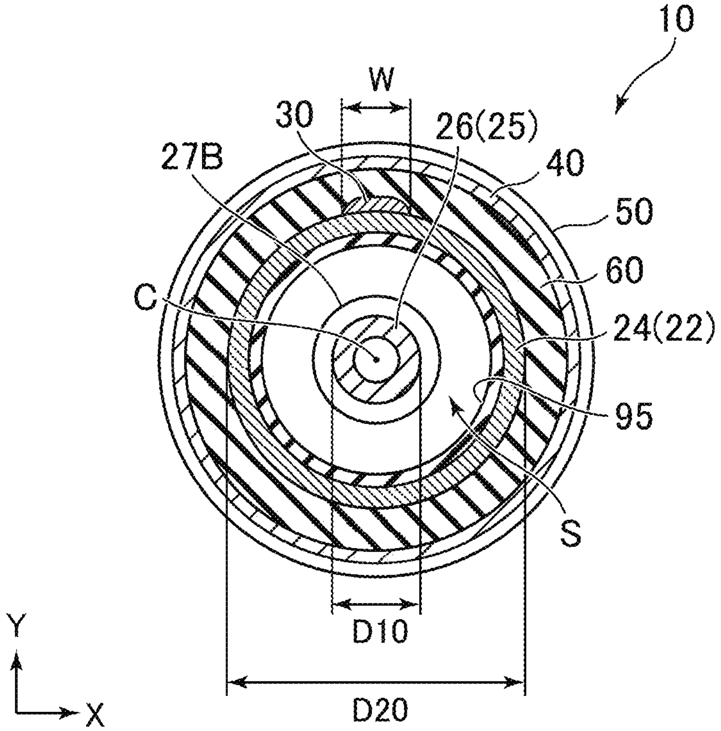
FIG. 3 is a cross-sectional view at the III-III line shown in FIG. 2.

FIG. 2 is a cross-sectional view of the excimer lamp 10 seen from one side of the lamp. FIG. 3 is a cross-sectional view of the excimer lamp at the III-III line shown in FIG. 2.

The excimer lamp 10 is equipped with a discharge tube (discharge vessel) 20 composed of a dielectric material such as quartz glass and a cladding tube 60. In the discharge tube 20, the flow channel R is formed along the axis of the discharge tube 20, i.e., the lamp axis C. The discharge tube 20 with a dual cylindrical tubular structure has an interior tube 25 and an exterior tube 22, of which the exterior tube 22 is welded to flanges M1 and M2 formed on the interior tube 25. The interior tube 25 is coaxially arranged in the exterior tube 22. A discharge space S is formed between the interior tube 25 and the exterior tube 22. A noble gas such as xenon or a mixing gas composed of a noble gas and a halogen gas is enclosed in the discharge space S as a discharge gas.

The cladding tube 60 is herein composed of a dielectric material such as quartz glass and is coaxially welded to the exterior tube 22. The cladding tube 60 covers the entire circumference of a segment of the discharge tube 20.

Figure 4:
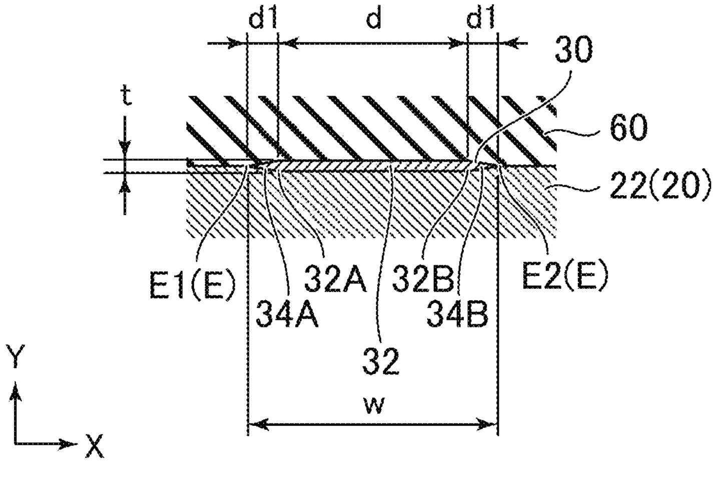
FIG. 4 is an enlarged cross-sectional view of a discharge tube in the excimer lamp.

One of the electrodes (hereinafter, called "inner electrode") 30 is a foil electrode and is provided between the cladding tube 60 and the discharge tube 20. Concretely speaking, the inner electrode 30 is embedded in the tube wall of the discharge tube 20 and welded to both the inner surface of the cladding tube 60 and the outer surface of the interior tube 25. The end of the inner electrode 30 is connected to a power supply rod 70 that connects to the power supply cable 1200. The inner electrode 30 may a be formed of high-conductive metal, an alloy, or materials easy to facilitate electrolytic polishing. Herein, molybdenum or an alloy including molybdenum, etc., is used. Note that the profile of the inner electrode 30 is shown in FIG. 4.

The other electrode (hereinafter, called "outer electrode") 40 is provided on the side of the outer surface of the cladding tube 60 and the exterior tube 22. The outer electrode 40 covers the entire circumference of the outer surface of cladding tube 60 and the exterior tube 22. The outer electrode 40 is herein a conductive membrane such as an aluminum membrane. The outer electrode 40 is connected to a ground via a power supply line (not shown) that is wound around discharge tube 20.

The outer electrode 40 is apart from the edge portion 60T2 of the cladding tube 60, from which the power supply rod 70 extends toward the outside of the excimer lamp 10. Thus, the likelihood of electrical breakdown between the outer electrode 40 and the power supply rod 70 is suppressed. Furthermore, an insulation tubular member 50 covers the edge 60T2 of the cladding tube 60, which further reduces the likelihood of electrical breakdown.

The interior tube 25 has a segment with a relatively small diameter (hereinafter, called "small diameter segment") 26 and segments with relatively large diameters (hereinafter, called "large diameter segments) 27A and 27B. The large diameter segments 27A and 27B are formed adjacent to the flanges M1 and M2 on the interior tube 25, respectively. The small diameter segment 26 between the large diameter segments 27A and 27B is formed in the discharge space S.

In the interior tube 25, the inner diameter "D1" of the interior tube 25 is substantially constant. On the other hand, the outer diameter of the interior tube 25 varies with respect to the lengthwise direction near the boundary of the large diameter segments 27A and 27B and the small diameter segment 26. The thickness "T11" of the large diameter segments 27A and 27B is greater than the thickness "T10" of the small diameter segment 26 so that the outer diameter "D11" of the large diameter segments 27A and 27B is greater than the outer diameter "D10" of the small diameter segment 26 (D11>D10).

In the exterior tube 22, a segment with a relatively large diameter (hereinafter, called a "large diameter segment") 24 and a segment with a relatively a small diameter segment (hereinafter, called a "small diameter segment") 23 are formed. Furthermore, a flange M3 is formed between the large diameter segment 24 and the small diameter segment 23. The large diameter segment 24 is formed in accordance to a section K in which the outer electrode 40 and the inner electrode 30 are opposite one another. The cladding tube 60 extends along the section K.

The small diameter segment 23 is formed at the end of the discharge tube 20 and extends from the flange M3 to the flange M1 formed on the interior tube 25. The small diameter segment 23 is not covered by the cladding tube 60. The flange M3 is formed adjacent to the edge 60T1 of the cladding tube 60. The diameter of the exterior tube 22 varies gradually across the small diameter segment 23, the flange M3 and the large diameter segment 24. The diameter and thickness of the flange M3 is greater than those same dimensions of the large diameter segment 24 and the small diameter segment 23. An introducing tube 21 is formed at the small diameter segment 23. The introducing tube 21 is opposite from the small diameter segment 26 of the interior tube 25, but not opposite from the large diameter segment 27A of the interior tube 25.

The volume of the discharge space S, especially the volume of a space corresponding to the section K in which a discharge occurs, affects the intensity of illuminance and amount of light that are needed when irradiating ultraviolet light into the fluid passing through the flow channel 25. The inner diameter "D20" of the exterior tube 22, the outer diameter D10 of the small diameter segment 26 of the interior tube 25, and the length along the lamp axis C of the excimer lamp 10 are determined in accordance to the volume of the discharge space S.

Herein, the inner diameter "D20" of the exterior tube 22 is greater than or equal to 1.3 times the outer diameter "D10" of the opposite small diameter segment 26. Preferably, the inner diameter "D20" of the exterior tube 22 is set to a value that is greater than or equal to 3 times the outer diameter "D10".

The thickness "T10" of the small diameter segment 26 is less than the sum of the thickness "T30" of the cladding tube 60 and the thickness "T20" of the large diameter segment 24 of the exterior tube 22. Note that the thickness of the inner electrode 30 is included in the above thickness of the sum of "T20" and "T30" since the thickness of the inner electrode 30 is insignificant compared to the cladding tube 60 and the exterior tube 22. The thickness "T20" of the exterior tube 22 is herein less than the thickness "T30" of the cladding tube 60. However, the thickness "T20" of the exterior tube 22 may be greater than the thickness "T30" of the cladding tube 60.

A reflecting membrane 95 is formed on the inner surface of the exterior tube 22 and reflects ultraviolet light into the discharge space S. The reflecting membrane 95 is herein arranged along section "K" and extends over the flange M3 where the inner diameter of the large diameter segment 24 and the small diameter segment 23 merge smoothly together. The reflecting membrane 95 does not extend to the flange M1, the introducing tube 21 formed on one side of the interior tube 25, or the flange M2 formed on the other end of the interior tube 25. The reflecting membrane 95 is composed of a material such as a $SiO_2$ that passes light for aiding the start of lighting. The light is emitted from a lamp (not shown) and enters into the exterior tube 22.

The polarities of the inner electrode 30 and the outer electrode 40 are herein set to an anode and a cathode, respectively. Then, a high frequency (for example, a frequency within the range of several kilohertz to a dozen kilohertz) and a high voltage (for example, a voltage within the range of several kilovolts to a dozen kilovolts) are supplied to the inner electrode 30 and the outer electrode 40. Consequently, a dielectric barrier discharge occurs between the inner electrode 30 and the outer electrode 40, and excimer light (ultraviolet light) having a specific spectrum (e.g., 172 nm) is emitted from the discharge space S.

FIG. 4 is a partially enlarged cross-sectional view of the discharge tube 20. Herein, direction X is defined as the width direction of the inner electrode 30 and direction Y is defined as the thickness direction of the inner electrode 30 perpendicular to the X direction.

As described above, the inner electrode 30 is an ultra-thin, band-shaped foil electrode and the thickness of the inner electrode 30 is suppressed relative to the width of the inner electrode 30. Herein, the ratio of the thickness to the width of the inner electrode 30 is less than or equal to 1/30. The inner electrode 30 is flattened between both edges along the width direction, i.e., X direction, whereas the edges of the inner electrode 30 are sharply pointed along the X direction. The shape of a flattened segment 32 with thickness "t" in the inner electrode 30 is generally constant. The wedge-shaped edge segments 34A and 34B taper from boundaries 32A and 32B of the flattened segment 32 toward the tips E1 and E2 (=E). The tips E1 and E2 of the inner electrode 30 have no meaningful thickness and are regarded as points. Note that the tips E1 and E2 are recognized visually as "points" when observing the cross-section of the inner electrode 40 microscopically.

The wedge-shaped edge segments 34A and 34B are tapered in a straight line and each has a symmetrical V-shape. The surfaces of the edge segments 34A and 34B are flat surfaces, and a taper angle "θ1" of the edge segment 34A and a taper angle "θ2" of the edge segment 34B are constant. The taper angle "θ1" is herein substantially equal to the taper angle "θ2". Note that the taper angles "θ1" and "θ2" are angles of inclination-to a center line of the inner electrode 30 along the X direction. For example, the taper angles (narrow angles) "θ1" and "θ2" may be measured by microscopically observing positions 100 μm apart from the tips E1 and E2 at the cross-section.

The taper angles θ1 and θ2 are set based on (1) the prevention of peeling between the cladding tube 60 and the exterior tube 22; (2) the current capacity depending upon the cross-sectional area of the flattened segment 32; and (3) the suppression of a rise in temperature caused by thermal energy (heat), and so on. The taper angles "θ1" and "θ2" are set to a range between 2-15 degrees, preferably between 2-10 degrees. The edge segments 34A and 34B with the above taper angles "θ1" and "θ2" extend along the lamp axis C. Note that the taper angle "θ1" may be different from the taper angle "θ2".

The flattened segment 32 is aligned with lamp axis C. The edge segments 34A and 34B are symmetrical to the flattened segment 32. The ratio of the length "d1" of the edge segments 34A and 34B to the width "w" of the inner electrode 30 is set to a value less than or equal to 0.2. Accordingly, the ratio of the length "d" of the flattened segment 32 to the width "w" of the inner electrode 30 is set to a value greater than or equal to 0.6.

As described above, the thickness "t" of the flattened segment 32 along the X direction is generally constant. The degree of flatness of the flattened segment 32 does not require a strict and severe flatness. Herein, the differences in thickness at different positions are permitted to some extent when observing the cross section of the inner electrode 30 microscopically. For example, the thickness "t" of the flattened segment 32 may be regarded as constant when the thickness of an arbitrary position along the X direction is greater than or equal to 0.7 of the maximum thickness of the flattened segment 32.

The shape of the inner electrode 30 explained above allows the micro excimer lamp 10 to exhibit superior lighting responsiveness while enhancing close contact between the exterior tube 22 and the cladding tube 60 and suppressing peeling of the inner electrode 30.

Primarily, electric field concentration occurs at both tips E1 and E2 of the inner electrode 30 over section K since the edge segments 34A and 34B are wedge-shaped and sharply pointed. Thus, the voltage required for starting the discharge can be suppressed. Since the tips E1 and E2 extend linearly along the lamp axis C, there is not a gap between the cladding tube 60 or the exterior tube 22 adjacent to the tips E1 and E2, which suppresses a peeling of the inner electrode 30.

On the other hand, the flattened segment 32 with the generally constant thickness "t" produces a relatively large cross-sectional area in the tube wall of the discharge tube 20, despite the extremely thin inner electrode 30. Enlargement of the inner electrode 30 along the thickness direction (Y direction) and the width direction (X direction) are not needed. Especially, since the percentage of the flattened segment 32 is greater than or equal to 0.6, thermal energy (Joule heating) is suppressed as electric current flows in the inner electrode 30 while the excimer lamp 10 is turned ON. Consequently, thermal expansion along the thickness direction and the width direction is suppressed.

As described above, the wedge-shaped edge portions 34A and 34B taper toward the points E1 and E2 with constant taper angles "θ1" and "θ2", i.e., the surfaces of the edge portions 44A and 44B are planar. Thus, electrolytic polishing of the edge portions 34A and 34B is simplified. Such polishing securely enables the suppression of peeling of the inner electrode 30 and enhancement of illuminance of the excimer lamp 10.

The width "w" of the inner electrode 30 is less than the outer diameter "D10" of the interior tube 25 (the small diameter segment 26). In other words, the width of the interior tube 25 is wider than the width of the inner electrode 30. Thus, discharge easily occurs adjacent to the outer surface of the interior tube 25 by the edge segments 34A and 34B of the inner electrode 30 and a part of the outer electrode 40 opposite to the inner electrode 30, which enables effective irradiation of ultraviolet light to the fluid flowing in the flow channel R.

As described above, the inner diameter "D20" of the large diameter segment 24 of the exterior tube 22 is greater than or equal to 1.3 times the outer diameter "D10" of the opposite small diameter segment 26 of the interior tube 25. When the inner diameter "D0" is too large, a relatively higher percentage of fluid flows through the flow channel R without irradiating the ultraviolet light, which decreases efficiency of the irradiation of ultraviolet light. On the other hand, when the inner diameter "D0" is too small, an amount of fluid flowing in the flow channel R decreases and the velocity of fluid increases, thus similarly decreasing the efficiency of the irradiation of ultraviolet light.

The ratio of the inner diameter "D20" of the large diameter segment 24 (exterior tube 22) to the outer diameter "D10" of the small diameter segment 26 (interior tube 25) determines the proper volume of the discharge space S for maintaining the efficiency of the irradiation of ultraviolet light even if the inner diameter "D0" of the interior tube 25 (small diameter segment 26) is relatively large. In this way, the interior tube 25 and the exterior tube 22 has a proper size to irradiate ultraviolet light to a flowing fluid effectively.

In the section K, the inner diameter "D0" of the small diameter segment 26 (interior tube 25) is constant. Since the small diameter segment 26 is not subjected to be heat-molding process and the state of a raw pipe is maintained during a manufacturing process, the inner diameter "D0" of the interior tube 25 is not different from other manufactured excimer lamps. Therefore, characteristics of irradiation of the ultraviolet light are stable in each manufactured excimer lamp, which maintain the reliability of the excimer lamp 10.

To enhance the efficiency of ultraviolet light, the small diameter segment 26 of the interior tube 25 is downsized in accordance to the volume of the discharge space S. On the other hand, the large diameter segments 27A and 27B are formed on opposite sides of the interior tube 25, which maintains the mechanical strength of the discharge tube 20 with the dual cylinder structure. Furthermore, the introducing tube 21 formed at the large diameter segment 23 of the exterior tube 22 is opposite to the small diameter segment 26, adjacent to the large diameter segment 27A of the interior tube 25, and away from the section K. Thus, the introducing tube 21 can be formed so as not to exceed the cladding tube 60. Then, the exhaustion of an impurity gas and enclosure of a pure gas can be effectively carried out via the introducing tube 21.

The excimer lamp 10 explained above can be manufactured by the following manufacturing process.

Firstly, a relatively small cylindrical tubes, composed of dielectric material such as a quartz glass, are subjected to a heat molding process to form a small diameter segment corresponding to the small diameter segment 26, large diameter segments corresponding to the large diameter segments 27A and 27B, and flanges corresponding to the flanges M1 and M2. Furthermore, a relatively large cylindrical tube, composed of dielectric material such as quartz glass, is subjected to a heat molding process to form an introducing tube corresponding to the introducing tube 21, a small diameter segment corresponding to the small diameter segment 23, a large diameter segment corresponding to the larger diameter segment 24, and a flange corresponding to the flange M3.

Then, the relatively small molded tube (interior tube) is inserted into the relatively large molded tube (exterior tube) and the opposite edges of the exterior tube are heated and welded to the opposite flanges of the interior tube to form a discharge space. Currently, an electrode corresponding to the inner electrode 30 is placed on the outer surface of the exterior tube. The welded dual tubes are inserted into a cylindrical and dielectric cladding tube corresponding to the cladding tube 60 so that the flange formed on the exterior tube engages with the edge of the cladding tube and the welded dual tubes are coaxially arranged in the cladding tube. Then, the cladding tube is heated and welded to the outer surface of the dual tubes.

The dual tubes welded to the cladding tube are subjected to a vacuum process to remove an impurity gas via the introducing tube. Then, a discharge gas is enclosed into the discharge tube by heating the introducing tube.

Figure 5:
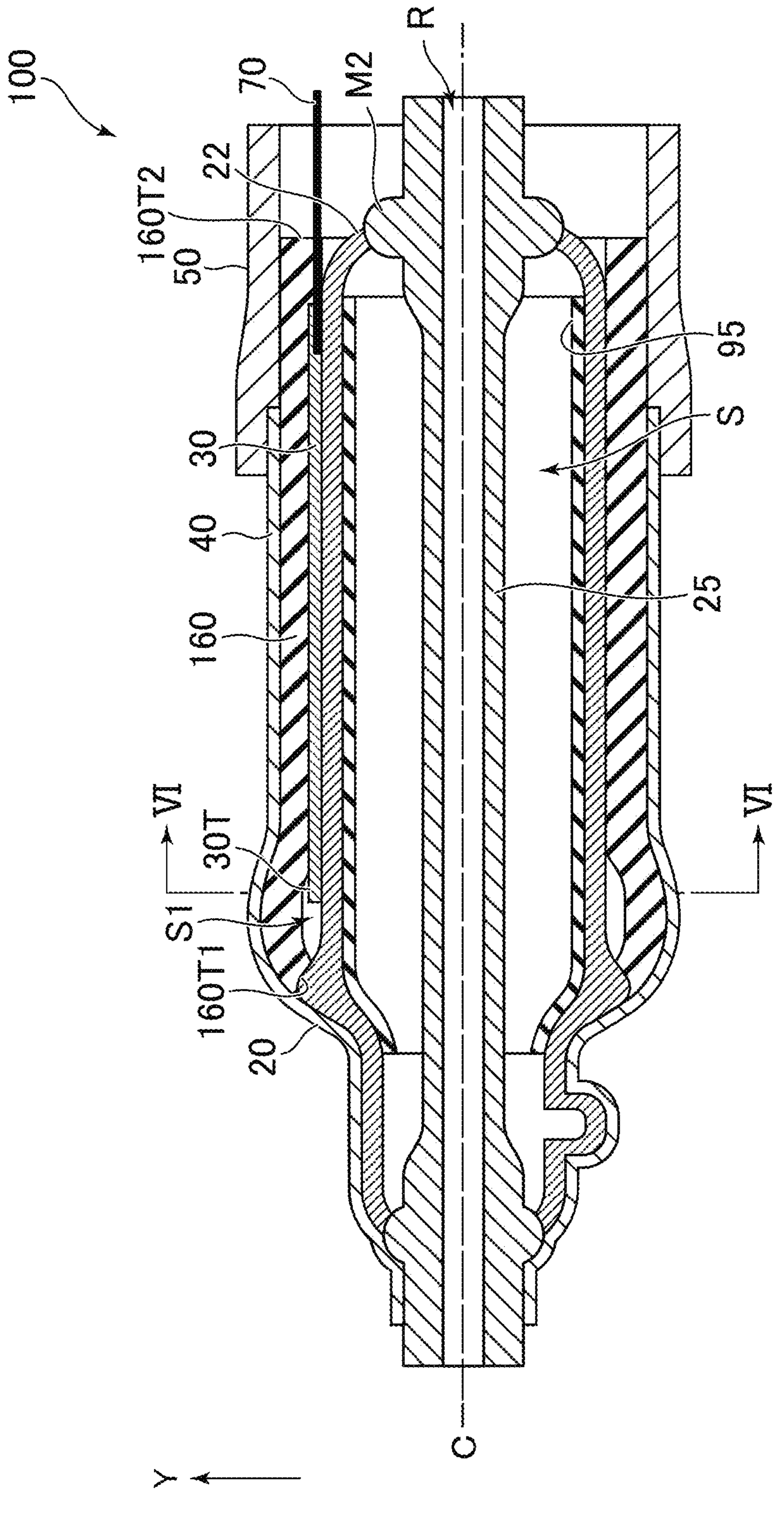
FIG. 5 is a cross-sectional view of an excimer lamp according to a second embodiment.
Figure 6:
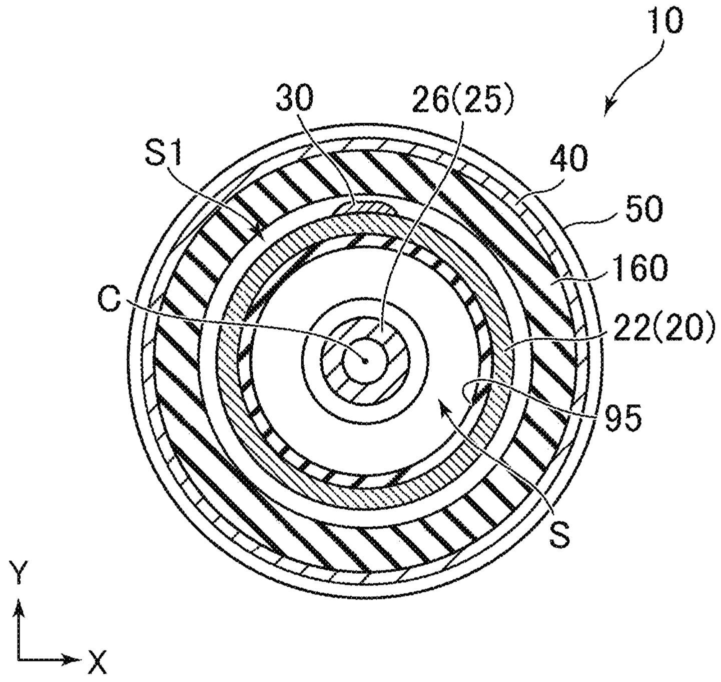
FIG. 6 is a cross-sectional view of the excimer lamp at the VI-VI line shown in FIG. 5.

With reference to FIGS. 5 and 6, an excimer lamp incorporated in a UV irradiation unit according to the second embodiment is explained.

FIG. 5 is a cross-sectional view of the excimer lamp according to the second embodiment. FIG. 6 is a cross-sectional view of the excimer lamp at the VI-VI line shown in FIG. 5. Note that the same numeral is referred to the same component in the first embodiment.

The excimer lamp 100 is a hollow cylinder-type excimer lamp that is similar to the first embodiment and equipped with a discharge tube 20, in which an interior tube 25 is welded to an exterior tube 22. A partial unwelded space exists between the cladding tube 160 and the exterior tube 22 so that an auxiliary discharge space S1 is formed. The edge of an inner electrode 30 is exposed to the auxiliary discharge space S1. The auxiliary discharge space S1 enhances the responsiveness of the start of discharge.

The excimer lamp 100 according to the second embodiment can be manufactured by the following manufacturing process. A cladding tube corresponding to the cladding tube 160 is heated to weld the edge of the cladding tube to a flange formed on an exterior tube corresponding to the exterior tube 22. In this heat-molding process, a part of the cladding tube is not welded to an outer surface area adjacent to the edge of an inner electrode. Thus, an auxiliary discharge space is formed. The other manufacturing process is similar to the first embodiment.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2023-184501 (filed on Oct. 27, 2023), which is expressly incorporated herein by reference, in its entirely.

The invention claimed is:

1. An excimer lamp comprising:

an exterior tube, an outer electrode being provided at the side of the outer surface of said exterior tube;

an interior tube coaxially arranged in said exterior tube; and an inner electrode embedded between said exterior tube and a cladding tube configured to cover at least part of said exterior tube, wherein said inner electrode is a foil electrode, the opposite sides of said inner electrode are flattened along the width direction, and both edges of said inner electrode are pointed, and wherein a width of said inner electrode is smaller than an outer diameter of said interior tube in a plan view.

2. The excimer lamp according to claim 1, wherein said interior tube comprising:

a large diameter segment with a flange, said flange being welded to said exterior tube to form a discharge space between said interior tube and said exterior tube; and a small diameter segment with a diameter smaller than that of said large diameter segment, said small diameter segment being formed at the side of the discharge space.

3. The excimer lamp according to claim 2, wherein said exterior tube comprises:

a small diameter segment not covered by said cladding tube, the diameter of said small diameter segment being smaller than that of a large diameter segment covered by said cladding tube, said small diameter segment of said exterior tube being opposite to at least part of said small diameter segment of said interior tube.

4. The excimer lamp according to claim 1, wherein the thickness of said interior tube is smaller than that of said exterior tube and said cladding tube.

5. The excimer lamp according to claim 1, wherein an inner diameter of said exterior tube is greater than or equal to 1.3 times the outer diameter of said interior tube.

6. The excimer lamp according to claim 1, wherein a reflecting membrane is provided on the inner surface of said interior tube in accordance to a section in which said inner electrode and said outer electrode are opposite one another.

7. The excimer lamp according to claim 1, wherein said cladding tube is welded to a part of said exterior tube, an auxiliary discharge space being formed in an unwelded space between said cladding tube and said exterior tube.

8. The excimer lamp according to claim 7, wherein a part of said inner electrode is exposed to the auxiliary discharge space.

9. A UV (Ultraviolet) irradiation unit comprising:

said excimer lamp described in claim 1; and an electric power supply device configured to supply electric power to said excimer lamp.

* * * * *